United States Patent [19]

Uschold

[11] Patent Number: 5,229,480
[45] Date of Patent: Jul. 20, 1993

[54] VINYL FLUORIDE POLYMERIZATION

[75] Inventor: Ronald E. Uschold, West Chester, Pa.

[73] Assignee: E. I. du Pont de Nemours and Company, Wilmington, Del.

[21] Appl. No.: 940,148

[22] Filed: Sep. 3, 1992

[51] Int. Cl.$^5$ ............................................. C08F 2/10
[52] U.S. Cl. ...................................... 526/217; 526/250
[58] Field of Search ................................ 526/217, 250

[56] References Cited

U.S. PATENT DOCUMENTS

| | | | |
|---|---|---|---|
| 2,419,008 | 4/1947 | Coffman et al. | 260/88 |
| 2,510,783 | 6/1950 | Johnston et al. | 260/92.1 |
| 2,774,751 | 12/1956 | Passino et al. | 526/217 |
| 2,820,027 | 1/1958 | Hansford | 526/217 |
| 2,952,669 | 9/1960 | Bro | 526/217 |
| 2,953,818 | 9/1960 | Bartron | 18/57 |
| 3,139,470 | 6/1964 | Smith et al. | 264/289 |
| 3,629,219 | 12/1971 | Esker | 526/217 |
| 4,025,481 | 5/1977 | Tournut et al. | 526/217 |
| 4,112,211 | 9/1978 | Kuhls et al. | 526/217 |
| 4,555,556 | 11/1985 | Beresniewicz | 526/217 |

FOREIGN PATENT DOCUMENTS

| | | | |
|---|---|---|---|
| 464223 | 4/1950 | Canada | 526/217 |
| 1192850 | 5/1970 | United Kingdom | 526/217 |

*Primary Examiner*—Joseph L. Schofer
*Assistant Examiner*—N. Sarofin

[57] ABSTRACT

In the aqueous polymerization of vinyl fluoride, the use of perfluoroalkylpropylamine salts as emulsifiers permits high yields and excellent polymer color.

7 Claims, 2 Drawing Sheets

VINYL FLUORIDE POLYMERIZATION

BACKGROUND OF THE INVENTION

Poly(vinyl fluoride) (PVF) is used in film form for a variety of protective and decorative applications.

The polymerization of vinyl fluoride (VF) has typically been carried out in water by means of a water soluble initiator such as 2,2'-azobis(isobutyroamidine) dihydrochloride to yield a highly fluid aqueous dispersion or slurry of very finely divided polymer particles. Polymerizations of this type, in which the initiator is water soluble and the monomer has limited water solubility, are often termed emulsion polymerizations. It is well known in the art of emulsion polymerization that the addition of surface active substances, or emulsifiers, the molecules of which are composed of hydrophilic and hydrophobic segments, improve the polymerization process. The improvement may be accomplished by better distribution of monomer within the aqueous phase, making it more available to the initiator, thus facilitating polymerization, or by stabilizing the dispersion of polymer particles, allowing more concentrated slurry to be produced without formation of large polymer agglomerations, or by a combination of both effects. The use of an emulsifier, therefore, offers advantages in productivity and economics.

The emulsifier, may, in general, have a hydrophilic segment that is cationic, anionic or nonionic in nature, while the hydrophobic segment is often alkyl or alkaryl in nature. To be compatible with 2,2'-azobis-(isobutyroamidine) dihydrochloride the emulsifier cannot be anionic in nature lest it form an insoluble complex salt with the initiator. Such salts have been found to be ineffective initiators for the polymerization process. A variety of nonionic and cationic emulsifiers are commercially available and are known to be useful in emulsion polymerization. Examples of many such materials are described in D. C. Blackley, "Emulsion Polymerization", Halsted Press, New York, N.Y., 1975, pp 308-318. The nonionic materials almost invariably contain hydrophilic segments derived from oligomers of ethylene oxide. While these emulsifiers are compatible with the 2,2'-azobis(isobutyroamidine) dihydrochloride initiator, they invariably produce low yields of low molecular weight PVF products that are not useful in typical applications for PVF. Common cationic emulsifiers such as dodecylammonium chloride or cetyl pyridinium chloride, specified by Blackley as useful in polymerizations for producing positively charged particles, are compatible with 2,2'-azobis(isobutyroamidine) dihydrochloride but produce PVF of low molecular weight in reduced yields and often contribute a highly undesirable yellow or brown color to the polymer. As such, none of these emulsifiers are suitable for emulsion polymerization of VF. Other cationic emulsifiers such as $C_6F_{13}CH_2CH_2SCH_2CH(OH)CH_2N(CH_3)_3$ Cl, manufactured by Ciba Geigy and offered under the tradename Lodyne ® S-106A, have similarly been found to inhibit polymerization and produce low molecular weight PVF.

SUMMARY OF THE INVENTION

The present invention is based on the discovery that certain emulsifiers enhance the polymerization rate of VF and support higher slurry solids without decreasing polymer molecular weight or contributing unwanted color to the product.

Specifically, the present invention provides, in a process for the polymerization of vinyl fluoride in an aqueous phase in the presence of an initiator and an emulsifier, the improvement wherein the emulsifier comprises at least one perfluoroalkylpropylamine salt of the general formula $F(CF_2CF_2)_nRNH_3X$ where R is selected from at least one of $CH_2CH_2CH_2$ and $CH_3CCH_3$, n is an integer of from 3 to 5, and X is an anion free from hydrogen atoms susceptible to attack by initiator or polymer radicals.

BRIEF DESCRIPTION OF THE DRAWINGS

The FIGS. 1-3 are graphical representations of the effect of emulsifiers on the polymerization rate of vinyl fluoride.

DETAILED DESCRIPTION OF THE INVENTION

Figure 1:
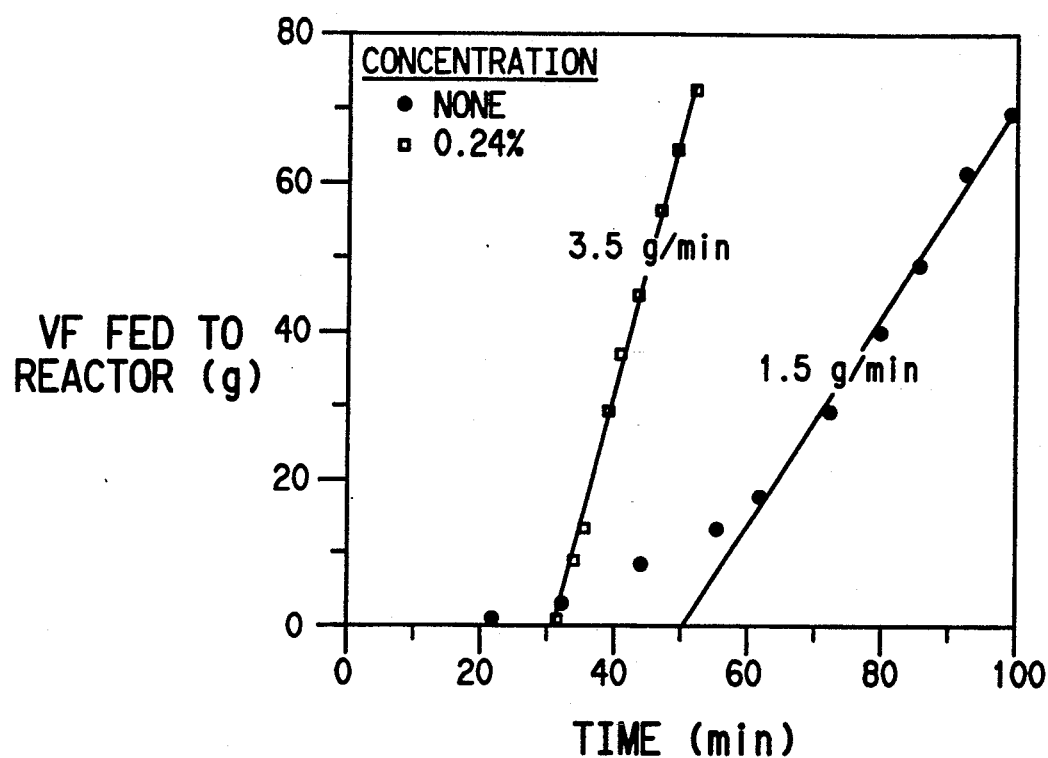

The basic polymerization process to which the present invention relates is well described in the art, for example, in U.S. Pat. Nos. 2,419,008, 2,419,010, 2,510,783, and 2,599,300, each of which is hereby incorporated by reference. As noted above, the process is an aqueous emulsion polymerization using a water soluble initiator.

The perfluoroalkylpropylamine salts used in the present invention can be prepared according to known techniques, by first preparing the amine and then converting to the desired salt.

Preparation of the amines where R is $CH_3CCH_3$ is detailed in Feiring, J. Org. Chem., 48, 347, (1983). Preparation of the amines where R is $CH_2CH_2CH_2$ is accomplished contacting the fluoroolefin, $F(CF_2CF_2)_nCH=CH_2$, with HCN in the presence of a nickel catalyst and a Lewis acid promoter such as zinc chloride by a process similar to that disclosed in Drinkard, et al., U.S. Pat. No. 3,496,217. The resulting nitrile, $F(CF_2CF_2)_nCH_2CH_2CN$, is converted to the amine, $F(CF_2CF_2)_nCH_2CH_2CH_2NH_2$, by reaction with hydrogen in the presence of ammonia and Raney cobalt.

A wide variety of salts of the perfluoroalkylamines other than the hydrochlorides can also be used as emulsifiers in the present invention, such as those generated by reaction of the amines with trifluoroacetic acid, benzene sulfonic acid, trifluoromethane sulfonic acid and the like, provided that the anions of the acids used in the preparation of such salts do not contain hydrogen atoms susceptible to attack by initiator or polymer radicals. Accordingly, the anions for the amines can be fluoride, bromide, trifluoroacetate, sulfonates such as trifluoromethane and benzene. Other monovalent anions will be readily apparent to those skilled in the art.

The hydrochloride salts can be prepared by adding the amine to excess HCl in a suitable solvent such as water or methanol followed by evaporation of the solvent under reduced pressure. Alternatively, the hydrochloride salt may be formed in situ in the polymerization medium by adding stoichiometric equivalent amounts of amine and HCl to water before polymerization is initiated.

Mixtures of emulsifiers can be used in accordance with the present invention. For example, blends of amine salts having various chain lengths and anions within the formula set forth above are effective in the polymerization.

The amount of the emulsifier used in the instant process can vary widely, depending on the need for emulsification as determined by the nature and concentration of the reaction ingredients. However, in general, about from 0.01 to 3 parts of emulsifier are used per 100 parts of water. Preferably, about from 0.02 to 1 part of emulsifier is used.

The polymerization can be conducted by a batch process in a vessel such as a shaker tube in which all materials are initially charged to the vessel and no additional ingredients are charged or discharged thereafter until the polymerization is complete, or by a semibatch process in a vessel such as a stirred autoclave in which all materials necessary to begin the polymerization are initially charged but additional ingredients such as monomer and initiator or other materials may be added to sustain the polymerization. A fully continuous process can also be used in which all necessary ingredients are continuously fed to a vessel and product slurry is continuously removed in such a way that conditions in the vessel remain in a steady state with regard to temperature, pressure and ingredient concentrations. In such continuous polymerizations, however, emulsifiers of the type $F(CF_2CF_2)_nRNH_3Cl$ where R is $CH_2CH_2CH_2$ and n is 3, 4 or 5 are preferably used, since these permit higher slurry solids in a continuous process. Mixtures of these amine hydrochlorides also function at least as well as the individual components. Polymerizations with the other emulsifier, where R is $CH_3CCH_3$, type led to excessive fouling of the reactor.

The reasons for the benefits obtained through the present invention are not fully understood. However, it is believed that the small size of the hydrocarbon portion of the emulsifiers used in the instant process permit them to be shielded from reaction with radicals by the perfluorocarbon portion of the hydrophobic segment. Such perfluorocarbon structures are known to be inert to radical intermediates commonly present in polymerization processes.

The present invention is further illustrated by the following Examples, in which VF is polymerized by batch, semibatch and continuous processes.

EXAMPLES 1–3 AND CONTROL EXAMPLES A–E

Batch polymerizations were conducted in 400 ml stainless steel shaker tubes by charging deionized water containing the desired surfactant and initiator to the tube, freezing its contents, then evacuating and purging the tube with nitrogen three times. Each tube was then placed in a shaker and VF monomer was then pumped into it. The quantities of the materials used are reported in Table 1. The shaker was started and the tube was then heated to 90° C. and maintained at that temperature for three hours under autogeneous pressure. The tube was then cooled and vented. The polymer was isolated on a suction filter or processed in a high speed centrifuge to yield a water wet cake which was dried in a vented circulating air oven at 90°–100° C. The polymer produced was weighed and its color noted as reported in Table 1. To judge the effect of the emulsifier on polymer molecular weight, melt viscosities were measured in a piston rheometer. Because PVF cannot be heated above its melting point of 190° C. for a convenient length of time without significant decomposition, viscosities of mixtures containing 40.0% PVF and 60.0% propylene carbonate were used for the melt viscosity determination at 150° C. at a shear rate of 23.4/sec. These results are reported as plasticized MV in Table 1.

Emulsifiers of the present invention are used in Examples 1–3, and result in high molecular weight PVF without sacrificing polymer yield. The color of the resulting polymer is excellent in all cases, including Example 3 in which an especially high concentration of the emulsifier was used.

No emulsifier was used in Control Example A, and, in Control Examples B–E, varying concentrations of other amine derivatives commonly employed as cationic surfactants and emulsifiers were used. These emulsifiers result in one or more of poor color, low molecular weight and low yield.

TABLE 1

| EXAMPLE | A | B | C | D | 1 | 2 | E | 3 |
|---|---|---|---|---|---|---|---|---|
| Water (ml) | 200 | 200 | 200 | 200 | 200 | 200 | 200 | 200 |
| Initiator* (g) | 0.10 | 0.10 | 0.10 | 0.10 | 0.10 | 0.10 | 0.10 | 0.10 |
| VF (g) | 100 | 100 | 100 | 100 | 100 | 100 | 70 | 70 |
| $C_{12}H_{25}N(CH_3)_3Cl$ (g) | — | 0.20 | — | — | — | — | — | — |
| $(C_{10}H_{21})_2N(CH_3)H\ Cl$ (g) | — | — | 0.20 | — | — | — | — | — |
| $C_{17}H_{35}C_6H_4NH\ Cl$ (g) | — | — | — | 0.10 | — | — | — | — |
| $C_6F_{13}(CH_2)_3NH_3\ Cl$ (g) | — | — | — | — | — | 0.40 | — | — |
| $C_8F_{17}C(CH_3)_2NH_3\ Cl$ (g) | — | — | — | — | 0.40 | — | — | 3.0 |
| Polymer made (g) | 34.2 | 7.2 | 11.5 | <1 | 27.0 | 27.5 | 16.4 | 17.4 |
| Color | white | yellow | yellow | — | white | white | white | white |
| Plasticized MV (Pa sec) | 973 | 189 | 209 | — | 684 | 1000 | 890 | 737 |

*2,2'-azobis(isobutyroamidine) dihydrochloride

The results in Table 1 show that polymerizations conducted in the presence of perfluoroalkylpropylamine hydrochlorides, as in Examples 1 and 2, produce white polymer in quantity and molecular weight similar to Control Example A which was conducted without any emulsifier. Similarly, Example 3, conducted with a relatively high concentration of emulsifier, produced polymer in quantity, appearance and melt viscosity similar to its Control Example E. In contrast, Control Examples B, C and D, conducted in the presence of common amine derived cationic surfactants, produced low yields of polymer that were discolored and of low molecular weight compared to Control Example A, in which no emulsifier was used.

EXAMPLES 4–5 AND COMPARATIVE EXAMPLE F

In Examples 4–5 and Comparative Example F, the effects of dodecylamine hydrochloride and emulsifiers of the present invention on polymerization rate are illustrated.

In Comparative Example F, a 1L hastaloy autoclave equipped with a magnetically driven agitator and operated at 4000 psi was charged with 850 ml of deionized water. As desired, a weighed amount of dodecylamine hydrochloride was dissolved in the water charged to the autoclave. The reactor was pressured and vented with nitrogen three times then brought to 90° C. VF gas from a storage cylinder on a scale was passed through a bed of silica gel to remove polymerization inhibitors before it was pumped into the reactor to bring its pressure to 4000 psi. The initiator feed was started. 2,2'-azobis(isobutyroamidine) dihydrochloride was fed as a 2% aqueous solution at constant rate, 0.50 ml/min, while VF was fed at a rate sufficient to maintain a constant reactor pressure until a total of 90 g was added. At that point, VF and initiator feeds were stopped and the reactor was cooled, vented, and its contents discharged. The VF cylinder weights recorded in time during the experiment were then plotted as shown in FIG. 1 and a least squares fit of the linear portion of the data was performed. The slope of the least squares line so calculated is the rate of monomer addition to the autoclave which is also a measure of the polymerization rate since the reactor pressure was held constant. Comparing the slopes of the plots in FIG. 1 corresponding to the control polymerization with no dodecylammonium chloride added to the water, to that for a similar experiment in which the concentration of dodecylammonium chloride was 0.24%, it can be seen that the rate of polymerization decreased from 3.5 g/min to 1.5 g/min when dodecylammonium chloride was present. That is, the dodecylammonium chloride retarded the polymerization.

Figure 2:
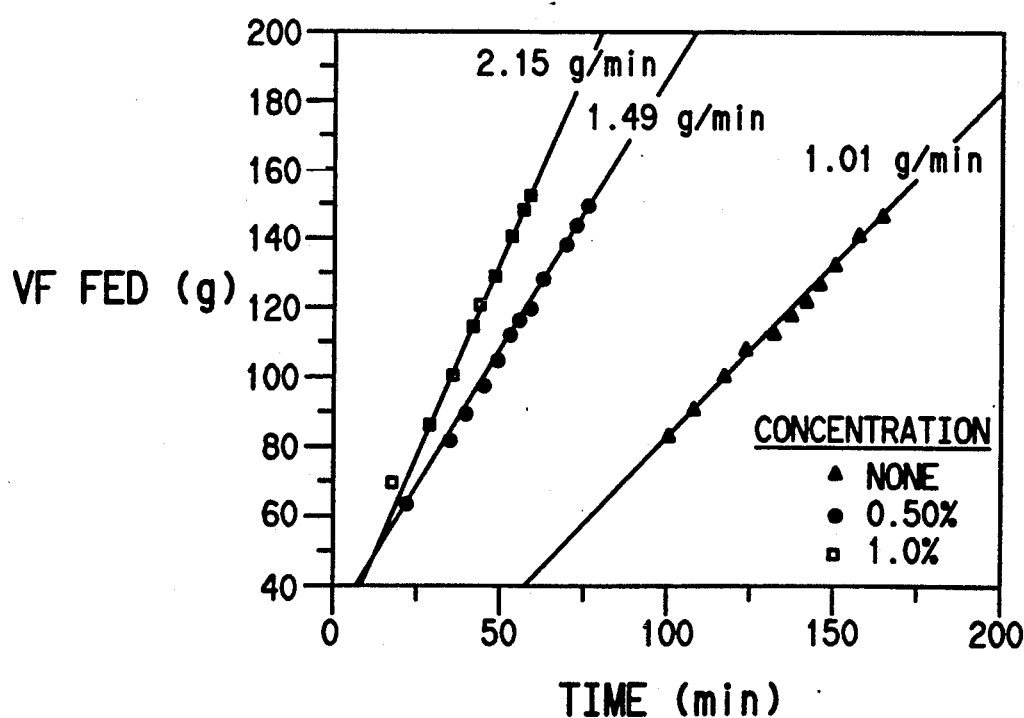
Figure 3:
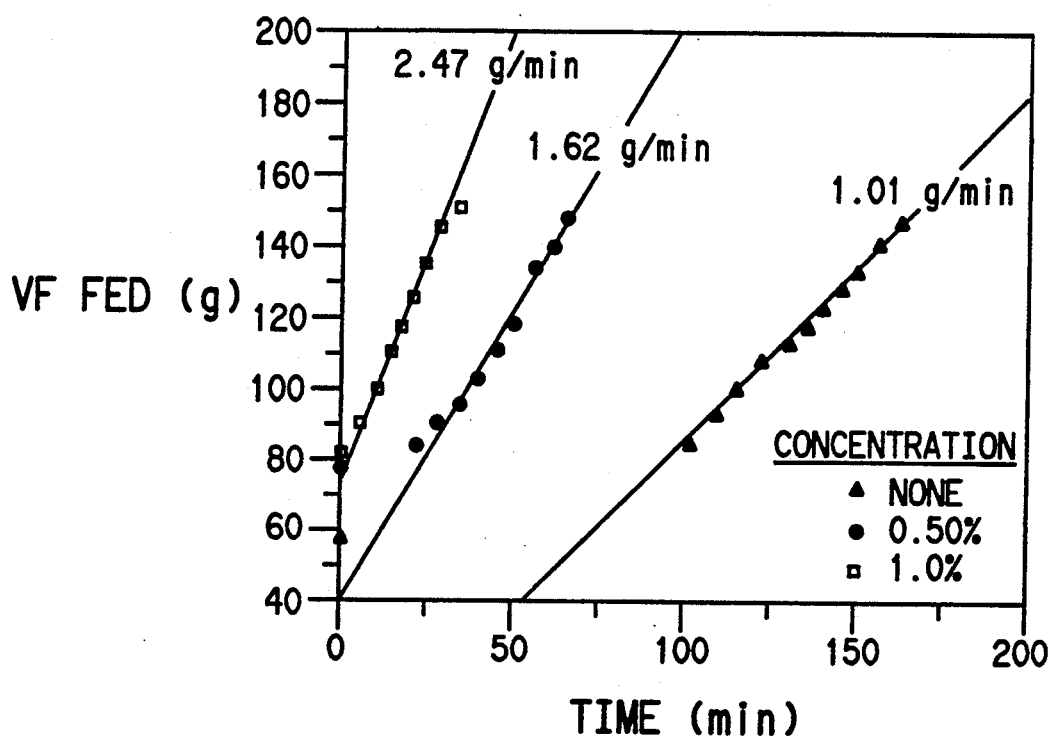

In Examples 4 and 5, a 1L hastaloy autoclave equipped with a magnetically driven agitator and operated at 500 psi was used to prepare PVF using 3-perfluorohexylpropylamine hydrochloride and 2-perfluorooctyl-2-propylamine hydrochloride salts in Examples 4 and 5, respectively. The autoclave was charged with 850 ml deionized water containing a weighed amount of the desired amine and the stoichiometric equivalent of hydrochloric acid. The reactor was pressured and vented with nitrogen three times then brought to 70° C. VF gas from a storage cylinder on a scale was passed through a bed of silica gel to remove polymerization inhibitors before it was pumped into the reactor to bring its pressure to 500 psi. The initiator feed was started. 2,2'-azobis(isobutyroamidine) dihydrochloride was fed as an 8% aqueous solution at constant rate, 0.2 ml/min, while VF was fed at a rate sufficient to maintain a constant reactor pressure until 150 g was added. At that point, VF and initiator feeds were stopped. The reactor was held at 70° C. for one hour, then it was cooled and vented, and its contents discharged. The rate of polymerization was determined as described above and the results obtained with 3-perfluorohexylpropylamine hydrochloride and 2-perfluorooctyl-2-propylamine hydrochloride are shown in FIGS. 2 and 3, respectively.

In contrast to the results with dodecylammonium chloride, the addition of 3-perfluorohexylpropylamine hydrochloride or 2-perfluorooctyl-2-propylamine hydrochloride increases the polymerization rate relative to the control experiment with no emulsifier added to the water in the autoclave. The increase in rate is proportional to the amount of perfluoroalkylpropylamine hydrochloride added with higher concentrations yielding higher polymerization rates. There is an initial period of low polymerization rate in the control experiments conducted in the absence of emulsifier. The initial period of low rate is extended by the addition of dodecylammonium chloride but shortened, and nearly eliminated, by the addition of perfluoroalkylpropylamine hydrochlorides. This further demonstrates their unique beneficial effect in VF polymerization.

The data demonstrate the rate enhancement for VF polymerization provided by the use of the perfluoroalkylpropylamine hydrochlorides. In contrast, other amine hydrochlorides, such as dodecylammonium chloride, retard the rate of VF polymerization.

EXAMPLES 6-14 AND CONTROL EXAMPLES G-K

These examples demonstrate the advantages of higher monomer conversion and higher reactor solids made possible by the use of perfluoroalkylpropylamine hydrochloride emulsifiers in a continuous VF polymerization.

A 1L hastaloy autoclave was used to conduct continuous polymerizations. The autoclave was equipped with a magnetically driven agitator, pumps to continuously feed water, initiator solution and liquified VF into the reactor, a pressure control valve to maintain the desired pressure inside the liquid full reactor and control the flow of polymer slurry from the reactor. VF gas from a storage cylinder on a scale was passed through a bed of silica gel to remove polymerization inhibitors. The VF was then liquified by means of a condenser maintained at −40° C. and fed by means of a pump to the reactor. Feed rates were determined from the rate of weight lost by the storage cylinder. Water containing emulsifier, if desired, was deaerated and stored under nitrogen in a container on a scale. Feed rates were determined from the rate of weight loss measured for the container as the water was pumped to the reactor. Initiator solution was fed from a buret by means of a pump to the reactor. Feed rates were measured by the rate of volume change observed in the buret. All experiments in this example were conducted at a reactor pressure of 8000 psi and a reactor temperature of 97° C. Initiator was fed as a 0.3% aqueous solution of 2,2'-azobis(isobutyroamidine) dihydrochloride.

TABLE 2

CONTINUOUS POLYMERIZATION OF VF

| EXAMPLE | 6 | 7 | 8 | 9 | G | H | I |
|---|---|---|---|---|---|---|---|
| Water Feed Rate g/min | 128.1 | 128.1 | 128.1 | 128.1 | 128.9 | 128.9 | 128.9 |
| Initiator solution Feed Rate ml/min | 0.98 | 2.05 | 3.36 | 4.64 | 0.99 | 2.08 | 3.76 |
| Initiator Concentration in Reactor wt % | 0.0022 | 0.0046 | 0.0074 | 0.0101 | 0.0022 | 0.0046 | 0.0082 |
| Emulsifier Type | C6 | C6 | C6 | C6 | none | none | none |
| Emulsifier Concentration in Reactor wt % | 0.050 | 0.050 | 0.050 | 0.050 | — | — | — |
| VF Feed Rate g/min | 18.9 | 18.9 | 18.9 | 18.9 | 18.8 | 18.8 | 18.8 |
| Slurry Solids wt % | 4.7 | 7.3 | 8.5 | 11.3 | 3.8 | 7.7 | 8.2 |
| Polymer Rate g/min | 6.4 | 10.2 | 12.2 | 16.9 | 5.1 | 10.9 | 11.8 |
| VF Conversion wt % | 33.7 | 54.2 | 64.6 | 89.5 | 27.3 | 58.1 | 63.0 |
| Space-Time Yield lbs/gal/hr | 3.19 | 5.13 | 6.11 | 8.47 | 2.57 | 5.47 | 5.93 |
| Plasticized MV Pa sec | 1909 | 1825 | 1612 | 1363 | 1816 | 1332 | 1128 |

TABLE 2-continued

| CONTINUOUS POLYMERIZATION OF VF | | | | | | | |
|---|---|---|---|---|---|---|---|
| EXAMPLE | J | 10 | 11 | 12 | 13 | 14 | K |
| Water Feed Rate g/min | 128.9 | 130.6 | 130.6 | 130.6 | 128.3 | 128.3 | 139.4 |
| Initiator solution Feed Rate ml/min | 4.75 | 1.36 | 2.23 | 3.76 | 3.32 | 4.54 | 4.26 |
| Initiator Concentration in Reactor wt % | 0.0103 | 0.0030 | 0.0049 | 0.0081 | 0.0073 | 0.0099 | .0085 |
| Emulsifier Type | none | Mixed | Mixed | Mixed | Mixed | Mixed | S106A |
| Emulsifier Concentration in Reactor wt % | — | 0.025 | 0.025 | 0.025 | 0.025 | 0.025 | 0.014 |
| VF Feed Rate g/min | 18.8 | 19.0 | 19.0 | 19.0 | 18.1 | 18.1 | 19.0 |
| Slurry Solids wt % | 6.5 | 3.9 | 8.1 | 10.6 | 8.6 | 10.3 | 6.4 |
| Polymer Rate g/min | 9.3 | 5.4 | 11.6 | 15.9 | 12.4 | 15.3 | 9.9 |
| VF Conversion wt % | 49.4 | 28.5 | 61.2 | 83.8 | 68.4 | 84.3 | 52.1 |
| Space-Time Yield lbs/gal/hr | 4.65 | 2.71 | 5.82 | 7.97 | 6.20 | 7.64 | 4.95 |
| Plasticized MV Pa sec | 888 | 1949 | 1736 | 1394 | 1128 | 1092 | 648 |

C6 = 3-perfluorohexylpropylamine hydrochloride
Mixed = Mixture of 45% 3-perfluorohexyl-, 40% 3-perfluorooctyl-, 10% 3-perfluorodecylpropylamine hydrochloride
S106A = Lodyne S-106A. ($C_6F_{13}CH_2CH_2SCH_2CH(OH)CH_2N(CH_3)_3Cl$)

Polymerization was started by establishing all feeds except initiator at the desired rates. The water feed was then increased in temperature to 97° C. by means of a tubular heat exchanger warmed with hot water. The initiator feed was then started and slowly increased to the desired rate. As polymerization began, the temperature of the hot water warming the heat exchanger was adjusted to cooler settings to compensate for the heat of polymerization and in order to maintain a constant reactor temperature. Slurry issuing from the reactor was separated from unconverted monomer by lowering its pressure to 100 psi and was collected in a second vessel containing a cooling coil. The collection vessel was emptied periodically to sample the polymer produced. Slurry solids were determined gravimetrically and used with the feed data to calculate polymerization rates, reactor space time yields and monomer conversions. Polymer was isolated from the slurry and used to measure its plasticized melt viscosity as described in Examples 1–3. Data for the experiments relating to this example are presented in Table 2 and were acquired after at least 30 minutes of operation at the specified conditions.

In Control Examples G, H, I and J, no emulsifier was used. As initiator solution feed rates increase from 0.99 to 3.76 ml/min, slurry solids increase from 3.8% to 8.2%, the space time yield increases from 2.57 to 5.93 lbs/gal/hr and monomer conversion increases from 27.3% to 63.0%. In Control Example J, further increases in initiator feed to 4.75 ml/min do not result in a further increase in reactor solids or monomer conversion. In fact, decreases in these observables were noted leading to a reduced space time yield of 4.65 lbs/gal/hr. Inspection of the reactor disclosed that it was full of coagulated polymer. The process apparently yields unstable slurry at that point leading to coagulation and ultimately loss of polymerization. The plasticized melt viscosity decreased for these polymers as expected from the increased initiator feed.

In Examples 6–9, the above procedures were substantially repeated except that 3-perfluorohexylpropylamine hydrochloride was added to the water feed to yield a 0.050% solution. In this case, increasing initiator feed from 0.98 to 4.64 ml/min led to uniformly increasing reactor solids from 4.7% to 11.3%, space time yield increased from 3.19 to 8.47 lbs/gal/hr and monomer conversion increased from 33.7% to 89.5%. Compared to the Control Examples, the 3-perfluorohexylpropylamine hydrochloride increased the productivity of the reactor by 43%. In addition, the decrease in plasticized melt viscosity for these polymers is much less than that experienced during the control experiments.

In Examples 10–14, the procedure was repeated except a mixture of 3-perfluoroalkylpropylamine hydrochlorides, consisting of 45% 3-perfluorohexyl-, 40% 3-perfluorooctyl-, 10% 3-perfluorodecyl-propylamine hydrochloride, was used instead of pure 3-perfluorohexylpropylamine hydrochloride. The total concentration of amine hydrochlorides was 0.025% in the water feed. The results show that higher slurry solids, monomer conversion, space time yields and plasticized melt viscosities compared to the controls are also obtained with the mixed emulsifier.

In Comparative Example K, another emulsifier, Lodyne ® S-106A, was used. Compared to Comparative Example I, in which no emulsifier was used but with similar initiator concentration, Lodyne ® S-106A leads to low reactor slurry solids, low space time yield and low plasticized melt viscosity even though its concentration in water is only 0.014%. This is in contrast to Examples 8 and 12, in which 3-perfluorohexylpropylamine hydrochloride or the mixed amine hydrochlorides produce higher reactor slurry solids, space time yields and plasticized melt viscosities under similar conditions.

These results demonstrate the superiority of the emulsifiers of the instant invention even though Lodyne ® S-106A has a similar fluoroalkyl segment. While this superiority is not fully understood, it may be due to the fact that the larger and more complex organic portion of the Lodyne ® S-106A molecule is accessible to and reactive with polymer and initiator radicals, leading to the poor results with this emulsifier.

I claim:

1. In a process for the polymerization of vinyl fluoride in an aqueous phase in the presence of an initiator and an emulsifier, the improvement wherein the emulsifier comprises at least one perfluoroalkylpropylamine salt of the general formula $F(CF_2CF_2)_nRNH_3X$ where R is selected from at least one of $CH_2CH_2CH_2$ and $CH_3CCH_3$, n is an integer of from 3 to 5, and X is an anion free from hydrogen atoms susceptible to attack by initiator or polymer radicals.

2. A process of claim 1 wherein the emulsifier is present in a concentration of about from 0.01 to 3 parts per hundred parts of water.

3. A process of claim 2 wherein the emulsifier is present in a concentration of about from 0.02 to 1 part per hundred parts of water.

4. A process of claim 1 wherein X is selected from the group consisting of fluoride, bromide, chloride, trifluoromethane sulfonate, trifluoroacetate, and benzene sulfonate.

5. A process of claim 4 wherein x consists essentially of chloride.

6. A process of claim 1 which is continuous and wherein the emulsifier is selected from $F(CF_2CF_2)_nCH_2CH_2CH_2NH_3Cl$ wherein n is an integer of from 3 to 5.

7. A process of claim 1 operated on a semi-batch basis.

* * * * *